United States Patent
Kim et al.

(10) Patent No.: US 8,195,089 B2
(45) Date of Patent: Jun. 5, 2012

(54) APPARATUS AND METHOD FOR COOPERATIVE TRANSMISSION IN MULTI-ANTENNA RELAY WIRELESS COMMUNICATION SYSTEM

(75) Inventors: Dong-Ho Kim, Seoul (KR);
Myeon-Kyun Cho, Gyeonggi-do (KR);
Yung-Soo Kim, Gyeonggi-do (KR);
Yeheskel Bar-Ness, Marlboro, NJ (US);
Osvaldo Simeone, Hoboken, NJ (US);
Nicola Varanese, Novara (IT)

(73) Assignees: Samsung Electronics Co., Ltd., Suwon-si (KR); New Jersey Institute of Technology, Newark, NJ (US)

( * ) Notice: Subject to any disclaimer, the term of this patent is extended or adjusted under 35 U.S.C. 154(b) by 1182 days.

(21) Appl. No.: 12/008,196

(22) Filed: Jan. 9, 2008

(65) Prior Publication Data
US 2008/0166975 A1 Jul. 10, 2008

(30) Foreign Application Priority Data
Jan. 9, 2007 (KR) .................. 10-2007-0002341

(51) Int. Cl.
*H04B 7/15* (2006.01)
(52) U.S. Cl. ............. 455/11.1; 455/15; 455/22; 455/24; 455/424; 455/445; 370/315; 370/274; 370/492; 375/211; 342/15; 342/353
(58) Field of Classification Search .............. 455/11.1, 455/9, 7, 15, 16, 20, 22, 24, 41.2, 408, 428, 455/445, 450, 455, 462; 370/315, 274, 266, 370/492, 498, 501; 375/211, 213, 130; 342/15, 342/353
See application file for complete search history.

(56) References Cited

U.S. PATENT DOCUMENTS

| | | | | |
|---|---|---|---|---|
| 7,596,352 | B2 * | 9/2009 | Ding et al. | 455/11.1 |
| 7,613,423 | B2 * | 11/2009 | Ngo et al. | 455/18 |
| 2006/0050655 | A1 * | 3/2006 | Shi et al. | 370/254 |
| 2006/0056338 | A1 * | 3/2006 | Abe et al. | 370/328 |
| 2006/0105709 | A1 * | 5/2006 | Oh et al. | 455/13.1 |
| 2007/0133552 | A1 * | 6/2007 | Kubo et al. | 370/395.2 |
| 2010/0272005 | A1 * | 10/2010 | Larsson et al. | 370/315 |

FOREIGN PATENT DOCUMENTS

KR 1020060050894 A 5/2006

* cited by examiner

*Primary Examiner* — Shaima Q Aminzay

(57) ABSTRACT

An apparatus and method for cooperative transmission in a multi-antenna relay wireless communication system are provided. A receiving end includes an estimator, a reader, a feedback unit and a detector. According to the present invention, the receiving end receives the signal from both the transmitting end and the relay station. Therefore, a reception gain is obtained and a high throughput can be ensured.

24 Claims, 11 Drawing Sheets

APPARATUS AND METHOD FOR COOPERATIVE TRANSMISSION IN MULTI-ANTENNA RELAY WIRELESS COMMUNICATION SYSTEM

CROSS-REFERENCE TO RELATED APPLICATION(S) AND CLAIM OF PRIORITY

This application claims priority under 35 U.S.C. §119(a) to a Korean patent application filed in the Korean Intellectual Property Office on Jan. 9, 2007 and assigned Serial No. 2007-2341, the entire disclosure of which is hereby incorporated by reference.

TECHNICAL FIELD OF THE INVENTION

The present invention relates to a multi-antenna relay wireless communication system. More particularly, the present invention relates to an apparatus and method for cooperative transmission in a multi-antenna relay wireless communication system.

BACKGROUND OF THE INVENTION

In a next generation, or 4th Generation (4G), communication system, research is being actively conducted to provide services having various Quality of Service (QoS) requirements, for example, a throughput of about 1 Gbps when stationary and a throughput of about 100 Mbps when on the move. In particular, research on the 4 G communication systems is ongoing so that mobility and QoS are ensured in a Broadband Wireless Access (BWA) communication system. Examples of the BWA system include a Wireless Local Area Network (WLAN) system and a Wireless Metropolitan Area Network (WMAN) system.

In order to improve transmission and reception throughput in the 4 G communication system, cooperative transmission using a relay station (RS) is considered. In the cooperative transmission, a transmitting end transmits a signal, and the signal is received by a receiving end and the RS. Thereafter, the RS retransmits to the receiving end the signal received from the transmitting end. As a result, the receiving end receives the signal from both the transmitting end and the RS. Therefore, a reception gain is obtained, and a high throughput can be achieved.

Throughput of the cooperative transmission can increase when an appropriate signal transmission policy is used between the transmitting end and the RS. One of methods for increasing the throughput of cooperative transmission is a method of determining a covariance matrix used for signal transmission of the transmitting end. That is, correlation between transmit (Tx) power of Tx antennas of the transmitting end and receive (Rx) power of Rx antennas of the receiving end and the RS is computed according to desired channel state information between nodes, and based on the computation result, Tx power for each antenna can be regulated when the transmitting end transmits a signal. Thus, the throughput of cooperative transmission can be improved. Furthermore, when the RS relays a signal, an optimal relay matrix may be determined to perform linear processing on the received signal, thereby improving the throughput of cooperative transmission.

As described above, communication quality can be improved by using the cooperative communication in the multi-antenna relay wireless communication system. In addition, the throughput of cooperative transmission can be improved by determining the covariance matrix for the transmitting end and the relay matrix for the RS. However, since there is no concrete method for optimizing the covariance matrix and the relay matrix, a problem arises when the cooperative transmission is performed.

SUMMARY OF THE INVENTION

An aspect of the present invention is to address at least the above-mentioned problems and/or disadvantages. Accordingly, an aspect of the present invention is to provide an apparatus and method for performing cooperative transmission in a multi-antenna relay wireless communication system.

Another aspect of the present invention is to provide an apparatus and method for optimizing a covariance matrix for a transmitting end and a relay matrix for a Relay Station (RS) in order to perform cooperative transmission in a multi-antenna relay wireless communication system.

Another aspect of the present invention is to provide an apparatus and method for determining antennas to be used by a transmitting end and an RS in order to perform cooperative transmission in a multi-antenna relay wireless communication system.

According to an aspect of the present invention, a receiving end apparatus in a multi-antenna relay wireless communication system using cooperative transmission is provided. The apparatus includes an estimator for estimating a channel between a transmitting end and an RS; a reader for reading channel gain information, which is fed forward from the RS, between the transmitting end and the RS with respect to all antennas; a feedback unit for determining a covariance matrix used to regulate power of a Transmit (Tx) signal with respect to all antennas of the transmitting end and a relay matrix used to process a signal from the RS based on the channel information received from the estimator and the reader, and for feeding back information on the determined matrices; and a detector for detecting the Tx signal by combining a signal received from the transmitting end at a first Tx time, a signal received from the transmitting end at a second Tx time, and a signal received from the RS at the second Tx time.

According to another aspect of the present invention, a receiving end apparatus in a multi-antenna relay wireless communication system using cooperative transmission is provided. The apparatus includes an estimator for estimating a channel between a transmitting end and an RS; a reader for reading information on a Tx antenna of the transmitting end, wherein the information is fed forward from the RS and the Tx antenna has priority for the RS; a feedback unit for selecting the Tx antenna of the transmitting end based on the channel information provided from the estimator and the reader, for feeding back antenna selection information to the transmitting end, and for feeding back channel information between the RS and the receiving end to the RS; and a detector for detecting the Tx signal by combining a signal received from the transmitting end at a first Tx time, a signal received from the transmitting end at a second Tx time, and a signal received from the RS at the second Tx time.

According to another aspect of the present invention, an operation method of a receiving end in a multi-antenna relay wireless communication system using cooperative transmission is provided. The method includes estimating a channel between a transmitting end and an RS; reading channel gain information, which is fed forward from the RS, between the transmitting end and the RS with respect to all antennas; determining a covariance matrix used to regulate power of a Tx signal with respect to all antennas of the transmitting end and a relay matrix used to process a signal from the RS using channel information; feeding back information on the determined matrices; and detecting the Tx signal by combining a signal received from the transmitting end at a first Tx time, a signal received from the transmitting end at a second Tx time, and a signal received from the RS at the second Tx time.

According to another aspect of the present invention, an operation method of a receiving end in a multi-antenna relay wireless communication system using cooperative transmission is provided. The method includes estimating a channel between a transmitting end and an RS; reading information on a Tx antenna of the transmitting end, wherein the information is fed forward from the RS and the Tx antenna has priority for the RS; selecting the Tx antenna of the transmitting end using channel information provided as a result of estimating and reading; feeding back antenna selection information to the transmitting end, and feeding back channel information between the RS and the receiving end to the RS; and detecting the Tx signal by combining a signal received from the transmitting end at a first Tx time, a signal received from the transmitting end at a second Tx time, and a signal received from the RS at the second Tx time.

According to another aspect of the present invention, a multi-antenna relay wireless communication system using cooperative transmission is provided. The system includes a receiving end for determining a covariance matrix used to regulate power of a Tx signal with respect to all antennas of the transmitting end and a relay matrix used to process a signal from the RS using channel information between a transmitting end and an RS, between the transmitting end and the receiving end, and the RS and the receiving end, and for feeding back information on the determined matrices; the transmitting end for transmitting signals at a first Tx time and a second Tx time by regulating Tx power for each antenna according to the covariance matrix; and the RS for receiving a signal from the transmitting end at the first Tx time and for transmitting the received signal at the second Tx time.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or;" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Hereinafter, a technique of the present invention which performs cooperative transmission in a multi-antenna relay wireless communication system will be described. A Relay Station (RS) of the present invention is assumed to use an Amplify and Forward (AF) scheme. However, the present invention may also apply to an RS that uses a Decode and Forward (DF) scheme.

Figure 1:
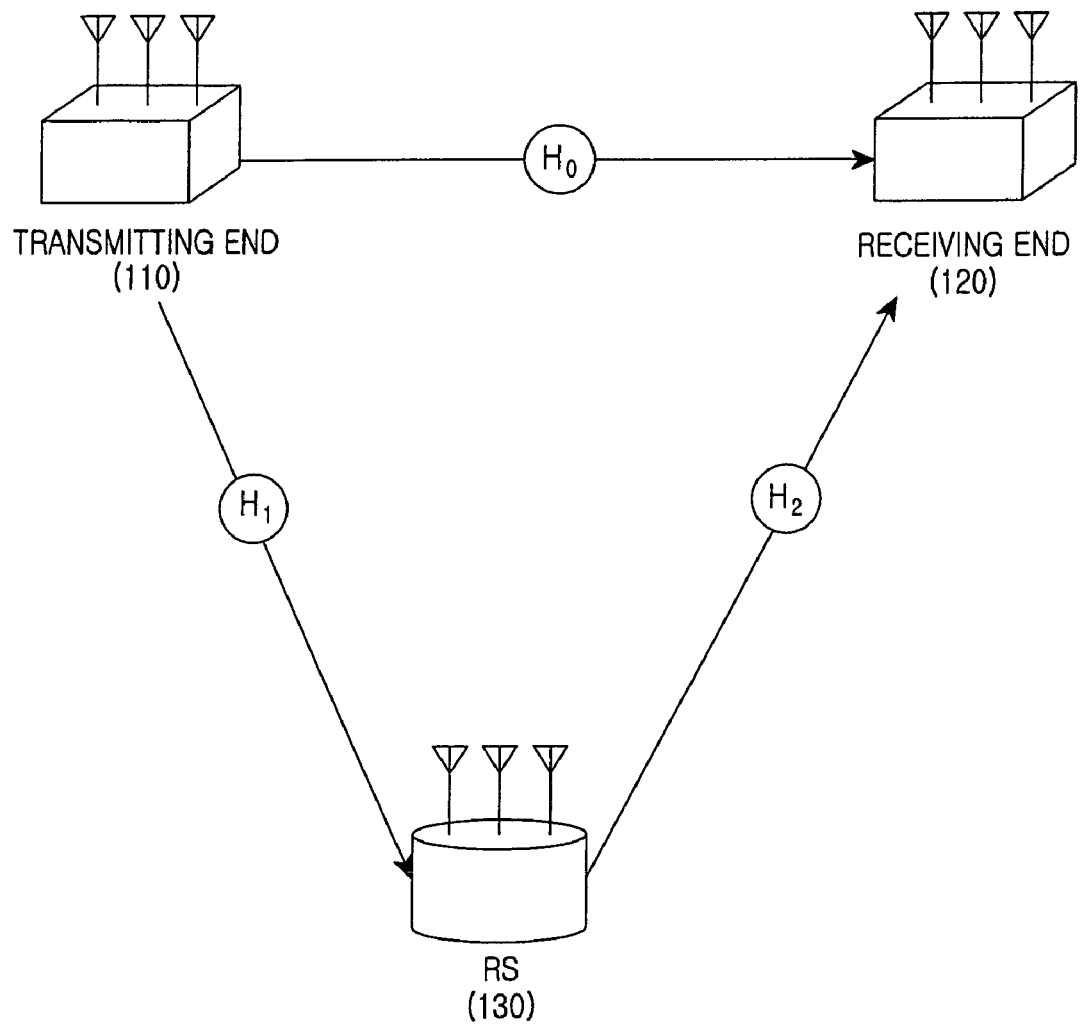
FIG. 1 is a schematic view illustrating cooperation transmission in a multi-antenna relay wireless communication system according to the present invention.

FIG. 1 is a schematic view illustrating cooperation transmission in a multi-antenna relay wireless communication system according to the present invention.

Referring to FIG. 1, a transmitting end 110, a receiving end 120, and an RS 130 each use multiple antennas. A channel between the transmitting end 110 and the receiving end 120 is defined as a channel $H_0$, a channel between the transmitting end 110 and the RS 130 is defined as a channel $H_1$, and a channel between the RS 130 and the receiving end 120 is defined as a channel $H_2$.

At a first Transmit (Tx) time, the transmitting end 110 transmits a signal to the receiving end 120 and the RS 130. Subsequently, at a second Tx time, the transmitting end 110 transmits a signal to the receiving end 120 while the RS 130 transmits to the receiving end 120 the signal received from the transmitting end 110. That is, the receiving end 120 restores information by combining all signals received from the transmitting end 110 and the RS 130 during the two times of transmission. In this case, the RS 130 multiplies the signal from the transmitting end 110 by a relay matrix, and retransmits the resultant signal to the receiving end 120.

The signal received by the receiving end 120 can be expressed by Equation 1 below:

$$\begin{bmatrix} y_1 \\ y_2 \end{bmatrix} = \begin{bmatrix} H_0 & 0 \\ H_2 G H_1 & H_0 \end{bmatrix} \begin{bmatrix} x_1 \\ x_2 \end{bmatrix} + N. \qquad [\text{Eqn. 1}]$$

In Equation 1, y1 denotes a signal received at the first Tx time, y2 denotes a signal received at the second Tx time, $H_0$ denotes a channel between the transmitting end 110 and the receiving end 120, $H_1$ denotes a channel between the transmitting end 110 and the RS 130, $H_2$ denotes a channel between the RS 130 and the receiving end 120, G denotes a relay matrix for multiplication in the RS 130, x1 denotes a signal transmitted by the transmitting end 110 at the first Tx time, x2 denotes a signal transmitted by the transmitting end 110 at the second Tx time, and N denotes noise.

In order to improve throughput of cooperation transmission, a signal transmission method between the transmitting end 110 and the RS 130 is determined. That is, covariance matrices Q1 and Q2 are determined to be used in the two times of transmission performed by the transmitting end 110 so as to regulate transmission power for all antennas of the transmitting end 110. In addition, a relay matrix G to be used between Transmit (Tx)/Receive (Rx) signals is determined for the RS 130. The covariance matrices Q1 and Q2 represent a relation between Tx power and Rx power for each pair of Tx antenna and Rx antenna, that is, represent information related to a gain. Information on all channels $H_0$, $H_1$, and $H_2$ between nodes is required in the determination of the relay matrix G and the covariance matrices Q1 and Q2. Since exchange of the channel information results in a system overhead, the relay matrix G and the covariance matrices Q1 and Q2 are preferably determined by a node that can obtain all channel information with least difficulty.

Therefore, the receiving end 120 that directly measures the channels $H_0$ and $H_2$ determines the relay matrix G and the covariance matrices Q1 and Q2. Of course, the receiving end 120 cannot directly measure the channel $H_1$. However, the receiving end 120 corresponds to the node that can obtain all channel information with least difficulty in comparison with the transmitting end 110 and the RS 130. Hence, the RS 130 must estimate a channel between the transmitting end 110 and the RS 130, and then fed forward the estimated channel to the receiving end 120. Accordingly, the system of the present invention must provide a fed forward channel of which information is transmitted from the RS 130 to the receiving end 120. In addition, feedback channels must also be provided so that the receiving end 120 can feed back the relay matrix G and the covariance matrices Q1 and Q2.

Now, structures of a transmitting end, a receiving end, and an RS for determining a transmission method of the transmitting end and the RS as described above will be described in detail with reference to the accompanying drawings. Two embodiments of the present invention will be explained in the following descriptions. In a first embodiment, the relay matrix G and the covariance matrices Q1 and Q2 are repeatedly configured to be optimized. A second embodiment is based on antenna selection for reducing loads of a feedback channel and a fed forward channel.

Figure 2:
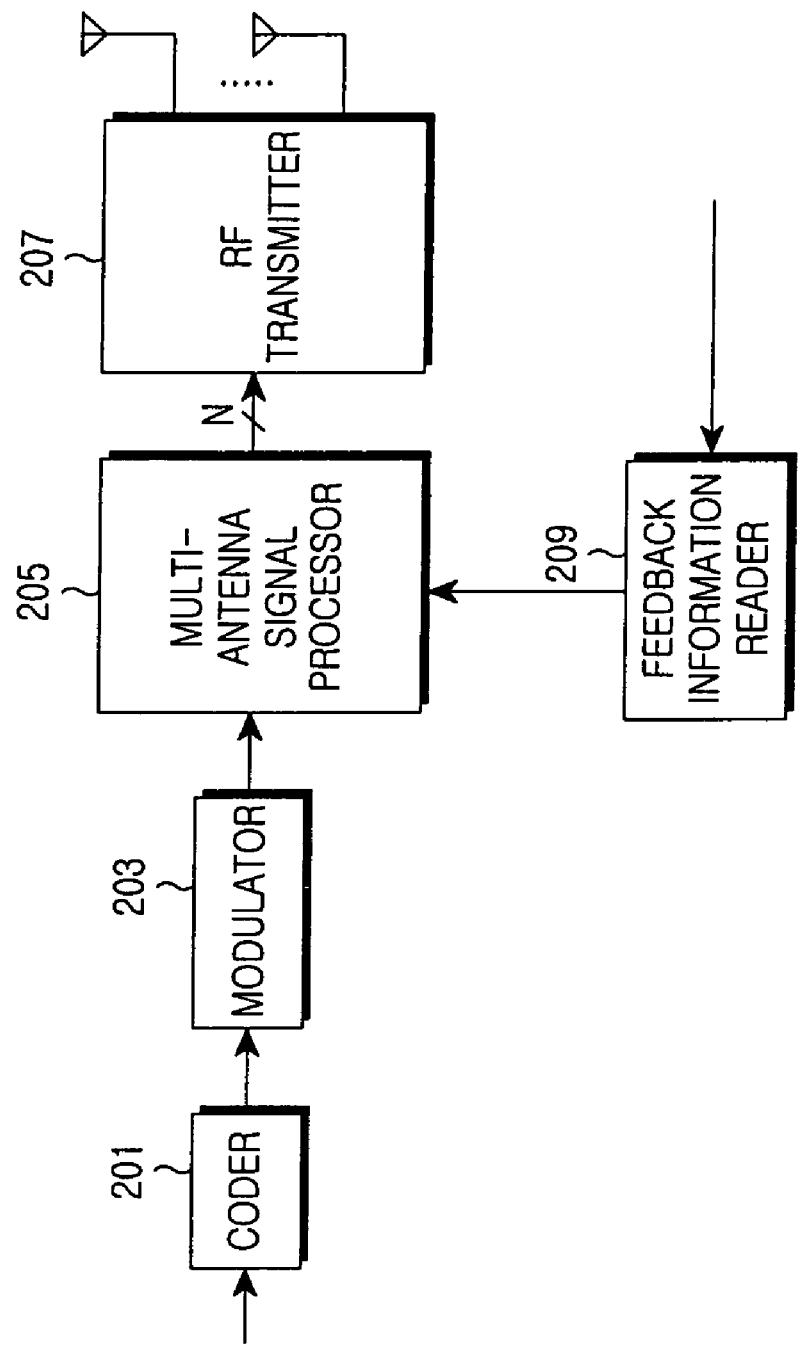
FIG. 2 is a block diagram of a transmitting end in a multi-antenna relay wireless communication system according to the present invention.

FIG. 2 is a block diagram of a transmitting end in a multi-antenna relay wireless communication system according to the present invention.

Referring to FIG. 2, the transmitting end includes a coder 201, a modulator 203, a multi-antenna signal processor 205, a radio frequency (RF) transmitter 207, and a feedback information reader 209.

The coder 201 performs channel coding on an information bit-stream according to a suitable method. The modulator 203 modulates the coded bit-stream provided from the coder 201, and then outputs complex symbols.

The multi-antenna signal processor 205 generates signals to be transmitted to respective streams according to a suitable multi-antenna communication method. For example, the multi-antenna communication method may be either a spatial multiplexing (SM) method or a space time coding (STC) method.

In particular, according to the present invention, the multi-antenna signal processor 205 processes a Tx signal according to information that is fed back from the receiving end. Specifically, if information on the covariance matrices Q1 and Q2 is fed back according to the first embodiment, the multi-antenna signal processor 205 regulates power of a signal output to an antenna according to the information on the covariance matrices Q1 and Q2. Further, if antenna selection information is fed back according to the second embodiment, the multi-antenna signal processor 205 processes a signal using only a stream corresponding to the selected antenna.

The RF transmitter 207 up-converts a signal from the multi-antenna signal processor 205 into an RF signal, and then transmits the converted signal through antennas. The feedback information reader 209 reads feedback information received from the receiving end through a feedback channel, and then provides the feedback information to the multi-antenna signal processor 205. The feedback information is the information on the covariance matrices Q1 and Q2 in the first embodiment and the transmission antenna selection information in the second embodiment.

Figure 3:
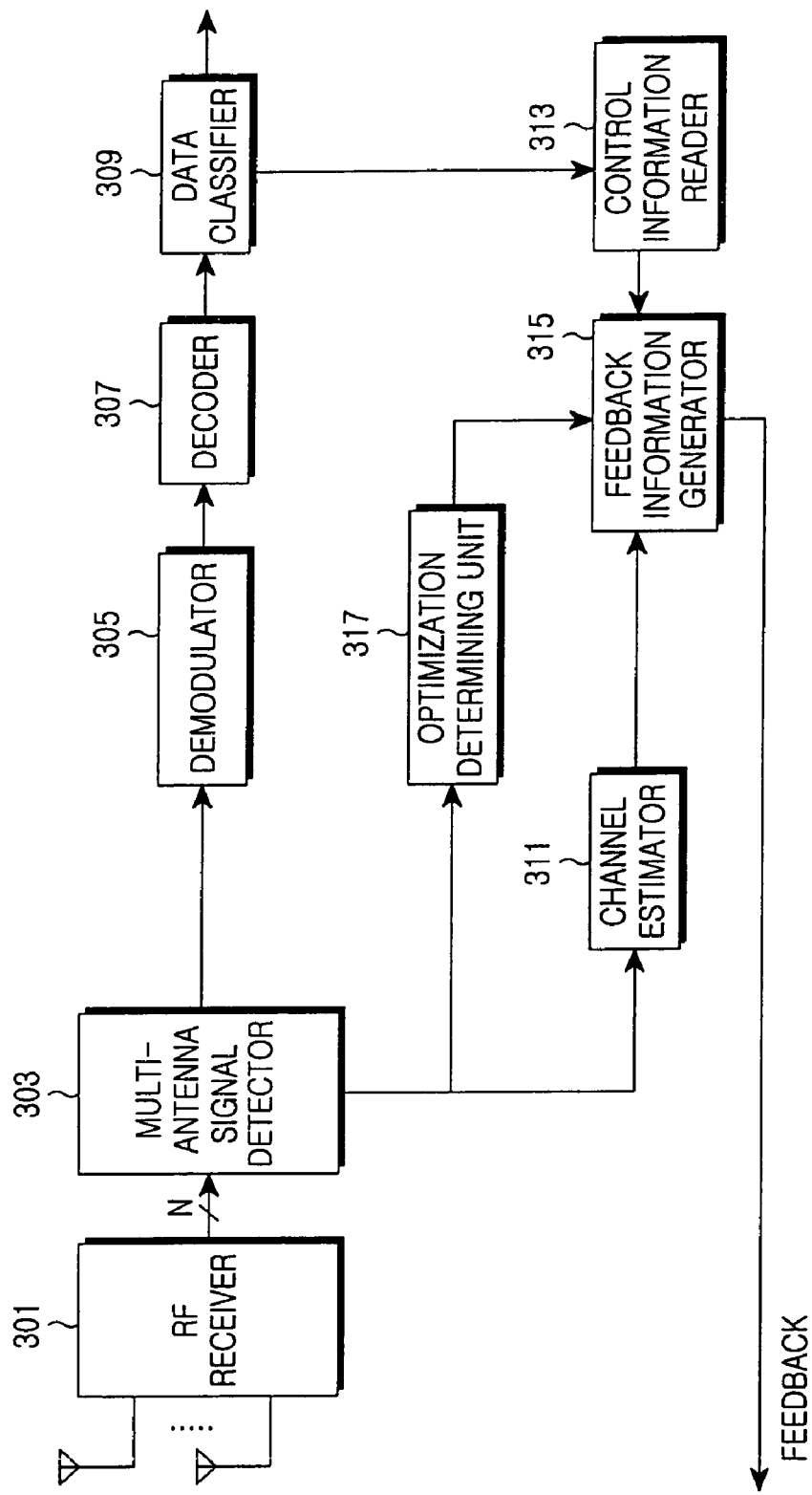
FIG. 3 is a block diagram of a receiving end in a multi-antenna relay wireless communication system according to the present invention.

FIG. 3 is a block diagram of a receiving end in a multi-antenna relay wireless communication system according to the present invention.

Referring to FIG. 3, the receiving end includes an RF receiver 301, a multi-antenna signal detector 303, a demodulator 305, a decoder 307, a data classifier 309, a channel estimator 311, a control information reader 313, a feedback information generator 315, and an optimization determining unit 317.

The RF receiver 301 down-converts an RF signal received through antennas into a baseband signal. The multi-antenna signal detector 303 estimates a Tx symbol according to a suitable multi-antenna communication method. In this case, the multi-antenna signal detector 303 detects the Tx signal by combining a signal received from the transmitting end at a first Tx time, and a signal received from the relay station at a second Tx time and a signal received from the transmitting end at a second Tx time. The demodulator 305 receives complex symbols from the multi-antenna signal detector 303, and then demodulates the complex symbols according to a suitable method. The decoder 307 receives a bit-stream from the demodulator 305, and decodes the bit-stream according to a suitable method. The data classifier 309 classifies the bit-stream from the decoder 307 into user data and control information. In particular, according to the present invention, the data classifier 309 provides the control information reader 313 with information that is fed forward from the RS.

The channel estimator 311 estimates channels of each antenna using a pilot signal provided from the RF receiver 301. The pilot signal is received from the transmitting end and the RS. That is, channels between the receiving end and the transmitting end and channels between the receiving end and the RS are estimated.

The control information reader 313 receives information that is fed forward from the RS, and then reads channel information for each antenna between the RS and the transmitting end. The feedback information generator 315 receives, from the channel estimator 311 and the control information reader 313, channel information between the transmitting end and the receiving end, between the transmitting end and the RS, and between the RS and the receiving end, and then configures control information to be fed back to the transmitting end and the RS. According to the first embodiment of the present invention, the feedback information generator 315 determines the relay matrix G for the RS and the covariance matrices Q1 and Q2 for the transmitting end based on the channel information, and then configures feedback information including the determined matrices. In addition, when the matrices are optimized, the feedback information generator 315 generates control information to be reported to the transmitting end and the RS. According to the second embodiment of the present invention, the feedback information generator 315 determines at least one of Tx antenna of the transmitting end based on the channel information, and then configures feedback information including the determined at least one of Tx antenna. In addition, according the second embodiment of the present invention, the feedback information generator 315 configures channel information, which is to be fed back to the RS, between the RS and the receiving end.

The optimization determining unit 317 determines whether the signal transmission method, that is, covariance matrices and relay matrix, is optimally configured. In other words, whenever the covariance matrices Q1 and Q2 and the relay matrix G are reconfigured according to the first embodiment, the optimization determining unit 317 measures Rx signal strength, and, if an improvement value of the Rx signal strength is less than or equal to a threshold, determines that optimal configuration is achieved. For example, the Rx signal strength may be a signal to interference and noise ratio (SINR), a signal to noise ratio (SNR), or a carrier to interference and noise ratio (CINR).

Alternatively, the optimization determining unit 317 may evaluate the number of times of performing the reconfiguration in order to determine whether optimization is achieved or not. That is, in terms of statistics, under the assumption that optimization is achieved when the reconfiguration is repeated by a predetermined number of times, the optimization determining unit 317 may determine whether optimization is achieved according to the number of times of performing reconfigurations. When the configuration of the two matrices is determined to be optimized, the optimization determining unit 317 controls the feedback information generator 315 to report to the transmitting end and the RS that optimization is achieved.

Figure 4:
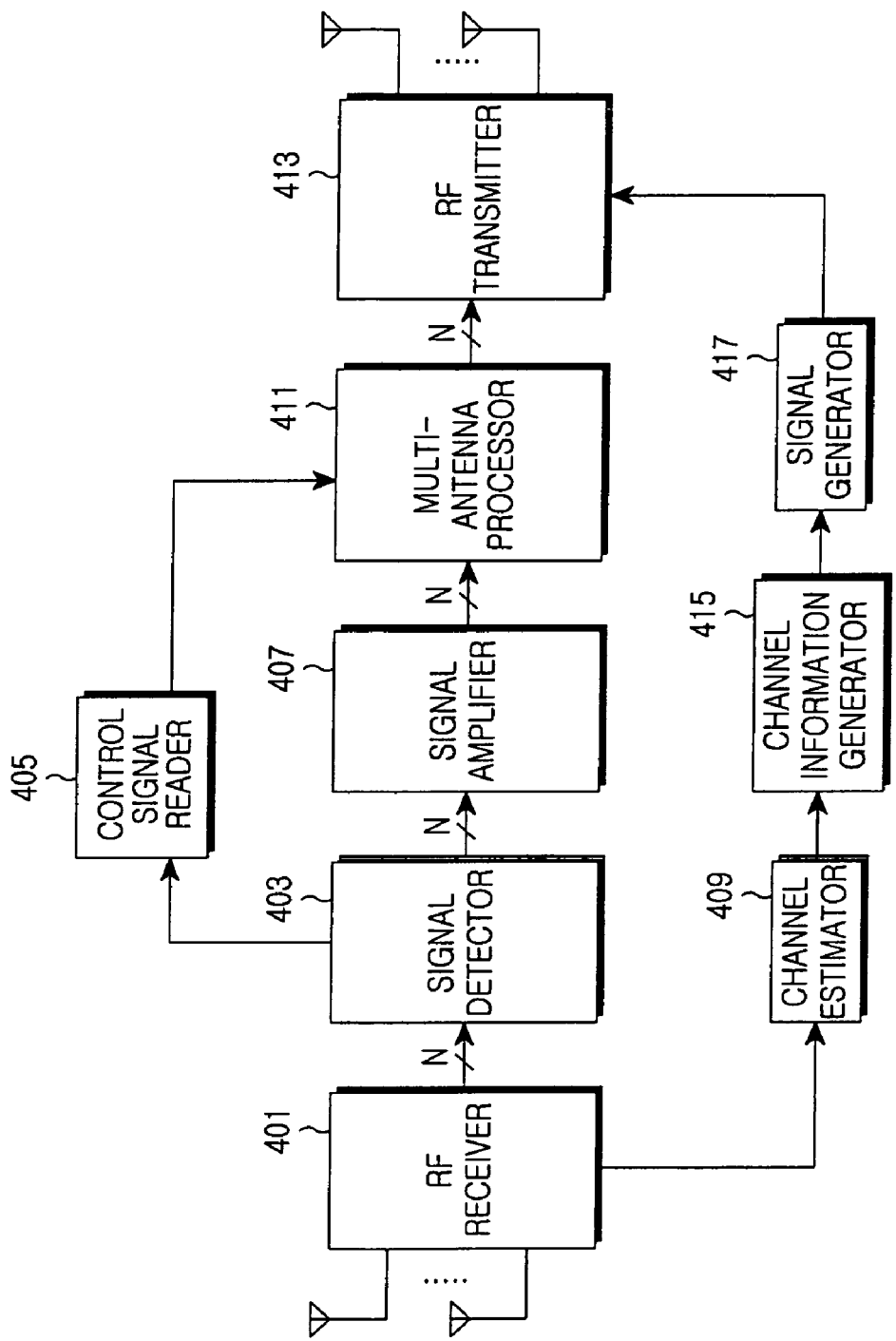
FIG. 4 is a block diagram of a Relay Station (RS) in a multi-antenna relay wireless communication system according to the present invention.

FIG. 4 is a block diagram of an RS in a multi-antenna relay wireless communication system according to the present invention.

Referring to FIG. 4, the RS includes an RF receiver 401, a signal detector 403, a control signal reader 405, a signal amplifier 407, a channel estimator 409, a multi-antenna processor 411, an RF transmitter 413, a channel information generator 415, and a signal generator 417.

The RF receiver 401 down-converts an RF signal received through an antenna into a baseband signal. The signal detector 403 receives signals of all antennas from the RF receiver 401, and then detects a signal for each antenna. In other words, the signal detector 403 detects a signal with respect to each stream, wherein the signal is received through multiple antennas in a mixed manner. In addition, the signal detector 403 outputs a data signal to the signal amplifier 407, and outputs a control signal to the control signal reader 405.

The control signal reader 405 receives the control signal from the signal detector 403, and demodulates and decodes the control signal. Then, the control signal reader 405 reads information included in the control signal. In particular, according to the present invention, the control signal reader 405 reads feedback information received from the receiving end. According to the first embodiment of the present invention, the control signal reader 405 reads the relay matrix G from information that is fed back from the receiving end, and then provides the relay matrix G to the multi-antenna processor 411. According to the second embodiment of the present invention, the control signal reader 405 reads channel information, which is fed back from the receiving end, between the RS and the receiving end. Then, the control signal reader 405 determines an antenna permutation matrix using not only the channel information fed back from the receiving end but also channel information, which is estimated by the channel estimator 409, between the transmitting end and the RS. The determined permutation matrix is provided to the multi-antenna processor 411.

The signal amplifier 407 amplifies a magnitude of a signal provided from the signal detector 403. According to a processing matrix provided from the control signal reader 405, the multi-antenna processor 411 processes a signal provided from the signal amplifier 407, and then outputs the processed signal to the RF transmitter 413. The processing matrix is the relay matrix G in the first embodiment and the antenna permutation matrix in the second embodiment.

The RF transmitter 413 converts a Tx signal of each antenna into an RF signal, wherein the Tx signal is provided from the multi-antenna processor 411. Then, the RF transmitter 413 transmits the converted signal through each antenna. The channel information generator 415 processes channel information provided from the channel estimator 409 according to a suitable method so as to feed forward the channel information to the receiving end. According to the first embodiment of the present invention, the channel information generator 415 configures channel information including channel gain information of all antennas. According to the second embodiment of the present invention, the channel information generator 415 configures channel information including priority information of all antennas. The signal generator 417 codes and modulates a bit-stream for the channel information provided from the channel information generator 415, converts the bit-stream into a signal, and outputs the signal to the RF transmitter 413.

Now, operations of all nodes according to the first embodiment of the present invention will be described with reference to the accompanying drawings.

First, operations of all nodes will be described in brief with reference to FIG. 1 according to the first embodiment of the present invention. The receiving end 120 estimates the channels $H_0$ and $H_2$, and then receives feed forward information on the channel $H_1$. After obtaining channel information of all links, the receiving end 120 determines the covariance matrices Q1 and Q2 for the transmitting end 110 and the relay matrix G for the RS. In the process of determining the two matrices, the receiving end 120 first fixes one matrix, and then determines the other matrix. Thereafter, the receiving end 120 measures reception throughput. Subsequently, the receiving end 120 determines again the fixed matrix, and then measures again the reception throughput. By iterating such process, the receiving end 120 obtains two matrices having optimal reception throughput. Thereafter, each node performs communication according to the determined matrices through cooperative transmission.

Figure 5:
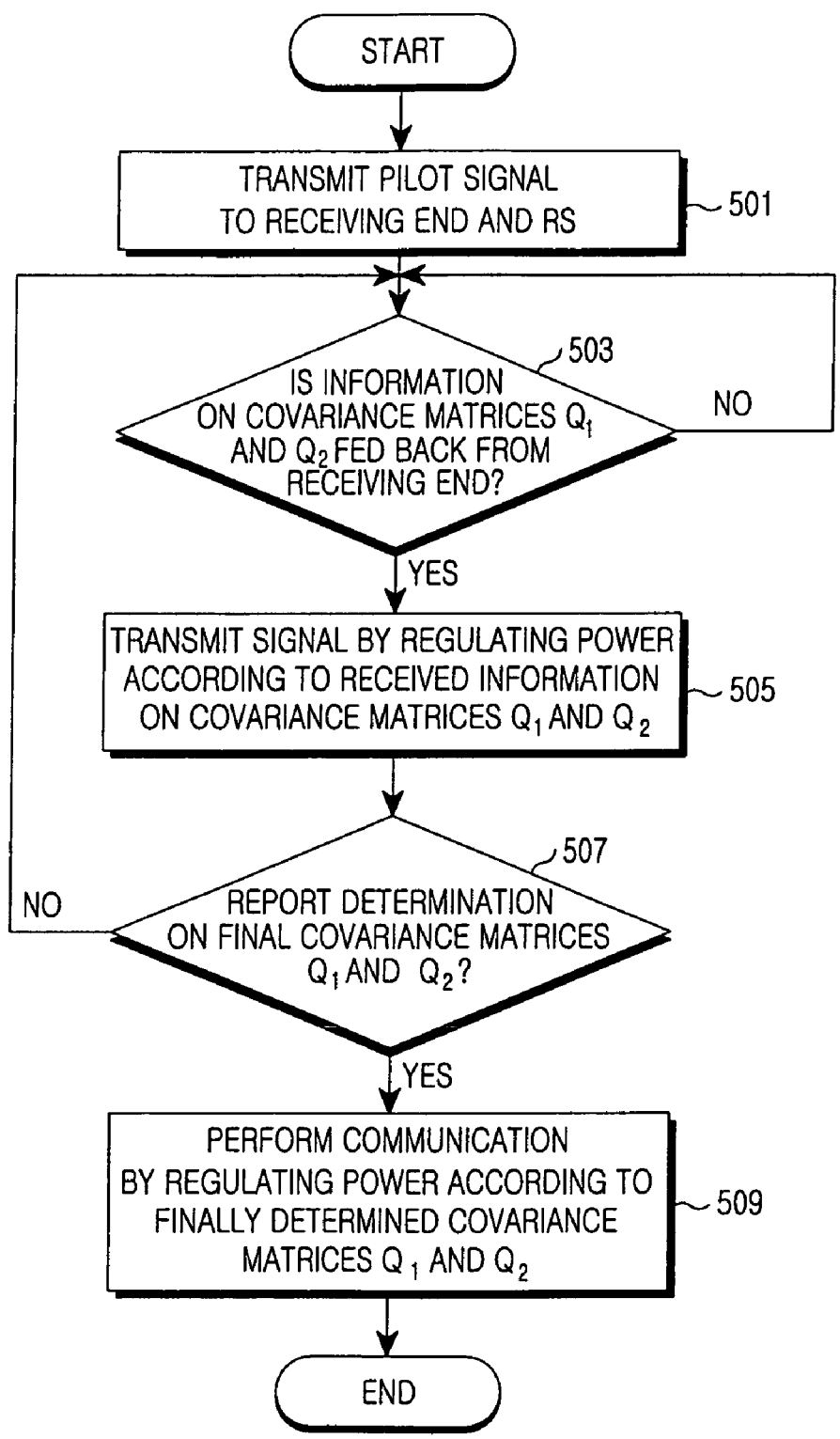
FIG. 5 is a flowchart illustrating a process in which a transmitting end determines a signal transmission method in a multi-antenna relay wireless communication system according a first embodiment of the present invention.

FIG. 5 is a flowchart illustrating a process in which a transmitting end determines a signal transmission method in a multi-antenna relay wireless communication system according to the first embodiment of the present invention.

Referring to FIG. 5, the transmitting end transmits a pilot signal to a receiving end and an RS in step 501.

In step 503, the transmitting end checks if information on covariance matrices Q1 and Q2 is fed back to the receiving end.

If the information on covariance matrices Q1 and Q2 is fed back, the receiving end regulates each antenna power according to the information on the covariance matrices Q1 and Q2, and then transmits the pilot signal in step 505.

In step 507, the transmitting end checks if the receiving end reports that final covariance matrices Q1 and Q2 are determined. That is, the transmitting end checks if the finally fed back information on the covariance matrices Q1 and Q2 is a value for maximizing reception throughput.

If the determination on the final covariance matrices Q1 and Q2 is not reported, returning back to step 503, the transmitting end checks if information on new covariance matrices Q1 and Q2 is fed back.

On the other hand, if the determination on the final covariance matrices Q1 and Q2 is reported, proceeding to step 509, the transmitting end regulates each antenna power according to the finally determined covariance matrices Q1 and Q2, and then performs communication through cooperative transmission. Specifically, regarding the covariance matrices Q1 and Q2, each antenna power at a first Tx time is regulated according to the first covariance matrices Q1, and each antenna power at a second Tx time is regulated according to the second covariance matrix Q2, thereby transmitting the same signal.

Figure 6:
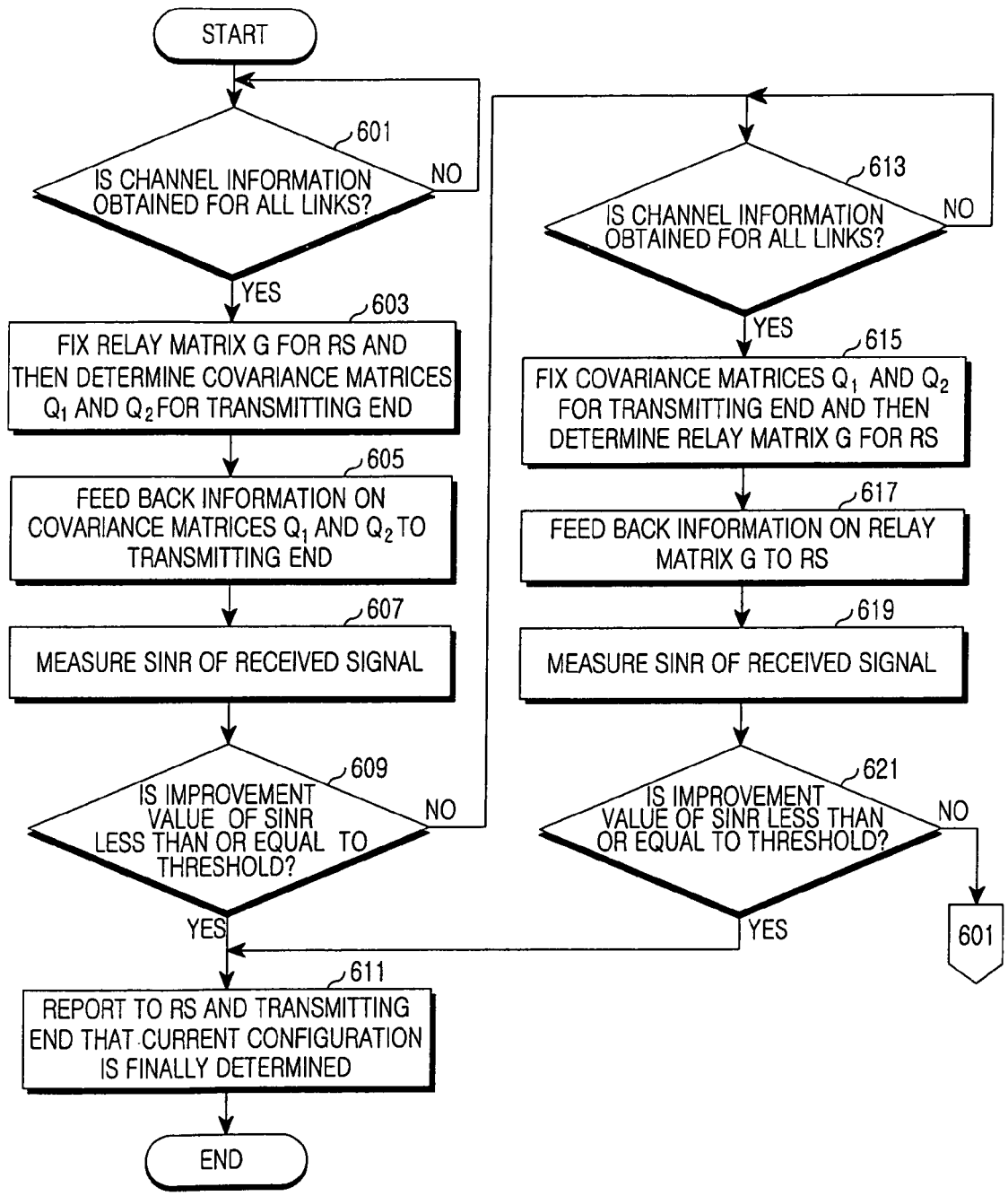
FIG. 6 is a flowchart illustrating a process in which a receiving end determines a signal transmission method for a transmitting end and an RS in a multi-antenna relay wireless communication system according to the first embodiment of the present invention.

FIG. 6 is a flowchart illustrating a process in which a receiving end determines a signal transmission method for a transmitting end and an RS in a multi-antenna relay wireless communication system according to the first embodiment of the present invention. In the process of FIG. 6, the receiving end optimizes covariance matrices Q1 and Q2 for the transmitting end and a relay matrix G for the RS by iteration, and an initial state is assumed to be a state in which the relay matrix G is set to an arbitrary value. Alternatively, however, in the process of FIG. 6, the initial state may be a state in which the covariance matrices Q1 and Q2 are first set to arbitrary values.

Referring to FIG. 6, the receiving end checks if channel information for all links is obtained in step 601. That is, each channel is estimated using a pilot signal received from the transmitting end and the RS, and it is checked if channel information between the transmitting end and the RS is fed forward. The channel information fed forward from the RS is a channel gain value for each antenna.

If channel information is obtained for all links, the receiving end fixes the relay matrix G for the RS, and then determines the covariance matrices Q1 and Q2 for the transmitting end based on the obtained channel information in step 603.

In step 605, the receiving end feeds back information on the determined covariance matrices Q1 and Q2 to the transmitting end.

In step 607, the receiving end measures an SINR of a signal received through cooperative transmission.

In step 609, the receiving end checks if an improvement value of the SINR, which is obtained as a result of the determination on the covariance matrices Q1 and Q2 in step 603, is less than or equal to a threshold. That is, the receiving end checks if the covariance matrices Q1 and Q2 and the relay matrix G are optimally configured.

If the improvement value of the SINR is less than or equal to the threshold, the receiving end reports to the receiving end and the RS that a current configuration is finally determined in step 611.

On the other hand, if the improvement value of the SINR is greater then the threshold, proceeding to step 613, the receiving end checks if channel information is obtained for all links.

If the channel information is obtained for all links, the receiving end fixes the covariance matrices Q1 and Q2 for the transmitting end, and then determines the relay matrix G for the RS in step 615.

In step 617, the receiving end feeds back information on the determined relay matrix G to the RS.

In step 619, the receiving end measures an SINR of a signal received through cooperative transmission. That is, the receiving end measures the SINR of the received signal while detecting a signal received from the transmitting end at a first Tx time, a signal received from the transmitting end at a second Tx time, and a signal received from the RS at the second Tx time.

In step 621, the receiving end checks if the improvement value of the SINR, which is obtained as a result of determining the relay matrix G in step 615, is less than or equal to a threshold. That is, the receiving end checks if the covariance matrices Q1 and Q2 and the relay matrix G are optimally configured.

If the improvement value of the SINR is greater than the threshold, returning back to step 601, the receiving end repeats the subsequent steps.

On the other hand, if the improvement value of the SINR is less than or equal to the threshold, proceeding to step 611, the receiving end reports to the transmitting end and the RS that a current configuration is finally determined.

In the aforementioned process of the receiving end as described with reference to FIG. 6, steps 607 to 609 and steps 619 to 621 are performed to determine if the covariance matrices Q1 and Q2 and the relay matrix G are optimally configured. The method of using the SINR as shown in FIG. 6 is only an example, and thus another index may be used to indicate reception throughput instead of the SINR. In addition, another method may be used in which the number of times of performing the process may be counted, and optimization is determined using a count value. That is, in terms of statistics, whether optimization is achieved may be determined under that assumption that optimization is achieved when the matrix determination process is repeated by a predetermined number of times.

Figure 7:
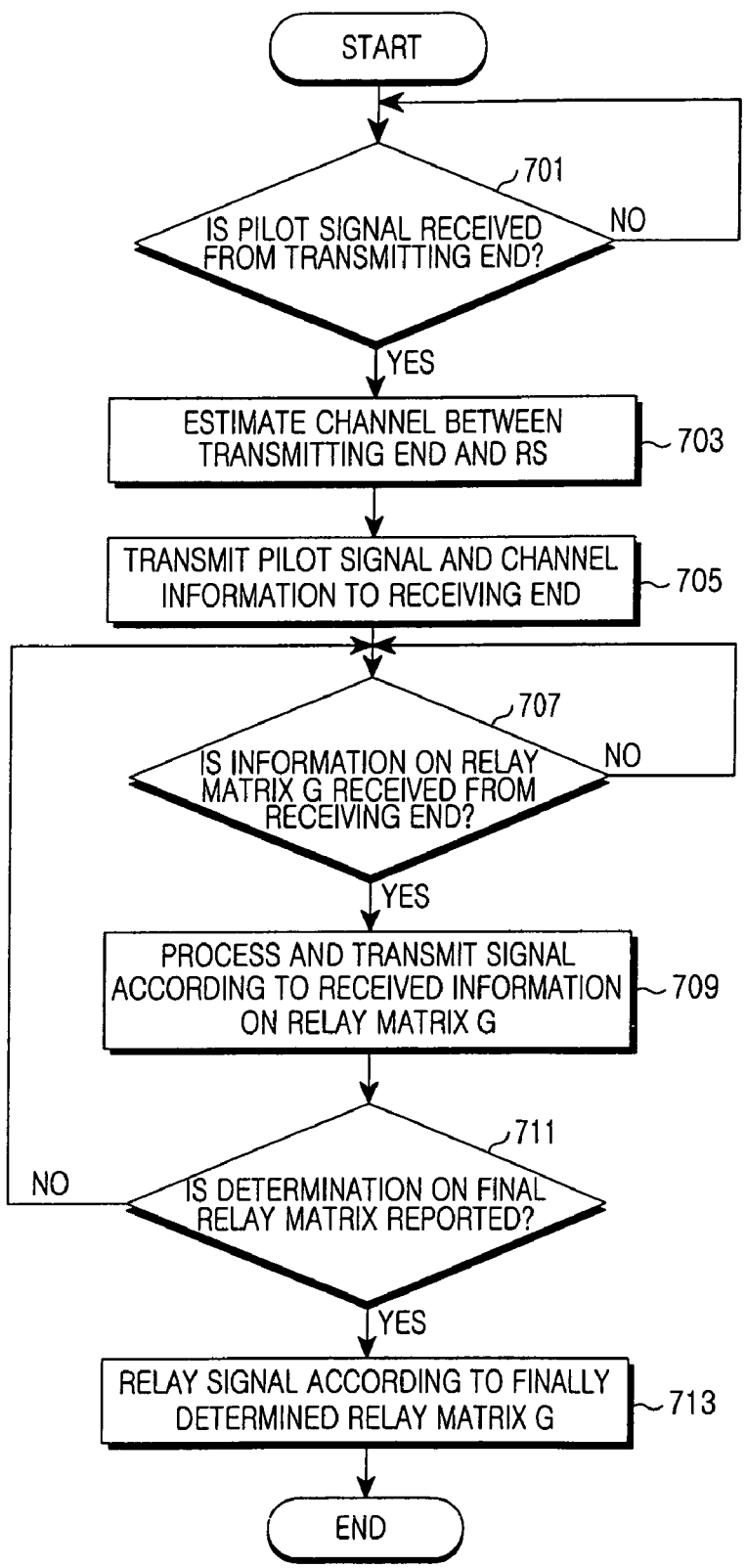
FIG. 7 is a flowchart illustrating a process in which an RS determines a relay signal processing method in a multi-antenna relay wireless communication system according to the first embodiment of the present invention.

FIG. 7 is a flowchart illustrating a process in which an RS determines a relay signal processing method in a multi-antenna relay wireless communication system according to the first embodiment of the present invention.

Referring to FIG. 7, the RS checks if a pilot signal is received from a transmitting end in step 701.

If the pilot signal is received, the RS estimates a channel between the transmitting end and the RS with respect to all antennas in step 703.

In step 705, the RS feeds forward the estimated channel information to the receiving end. In addition, the RS transmits the pilot signal to the receiving end. The channel information that is fed forward to the receiving end is a channel gain value for each antenna.

In step 707, the RS checks if information on a relay matrix G is fed back from the receiving end.

If the information on the relay matrix G is fed back, the RS processes a signal from the transmitting end according to the information on the relay matrix G, and then transmits the processed signal to the receiving end in step 709.

In step 711, the RS checks if the receiving end reports that a final relay matrix G is determined. That is, the RS checks if the finally fed back information on the relay matrix G is a value for maximizing reception throughput.

If the final determination is not reported, the procedure returns back to step 707.

On the other hand, if the final determination is reported, the RS relays to the receiving end a signal from the transmitting end according to the finally determined relay matrix G in step 713.

Now, operations of all nodes will be described in detail with reference to the second embodiment of the present invention.

First, operations of all nodes will be described in brief with reference to FIG. 1 according to the second embodiment of the present invention. The receiving end 120 estimates the channels $H_0$ and $H_2$, and then receives feed forward information on the channel $H_1$. Subsequently, the receiving end 120 selects a Tx antenna of the transmitting end 110 using the channel information, and feeds back the selection result to the transmitting end 110. In addition, the receiving end 120 feeds back information on the estimated channel H2 to the RS 130. Upon receiving the feedback of the information on the channel $H_2$, the RS 130 determines a matching method (i.e., an antenna permutation matrix) for an Rx antenna and a Tx antenna. Thereafter, each node performs communication according to the determined antenna permutation matrix through cooperative transmission.

Figure 8:
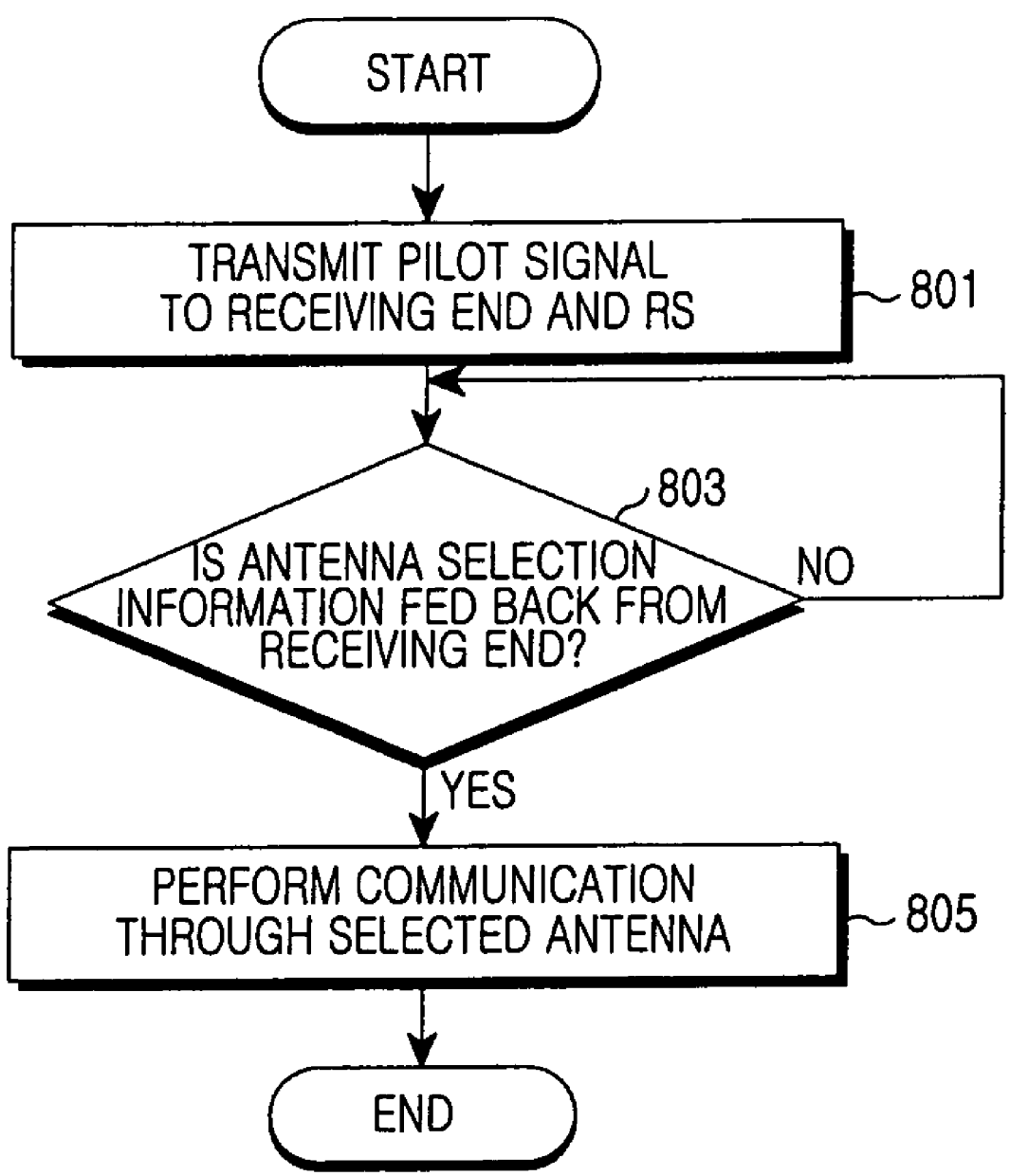
FIG. 8 is a flowchart illustrating a process in which a transmitting end determines a signal transmission method in a multi-antenna relay wireless communication system according to a second embodiment of the present invention.

FIG. 8 is a flowchart illustrating a process in which a transmitting end determines a signal transmission method in a multi-antenna relay wireless communication system according to the second embodiment of the present invention.

Referring to FIG. 8, the transmitting end transmits a pilot signal to a receiving end and an RS in step 801.

In step 803, the transmitting end checks if antenna selection information is fed back from the receiving end.

If the antenna selection information is fed back, the transmitting end performs communication through the selected antenna through cooperative transmission in step 805.

Figure 9:
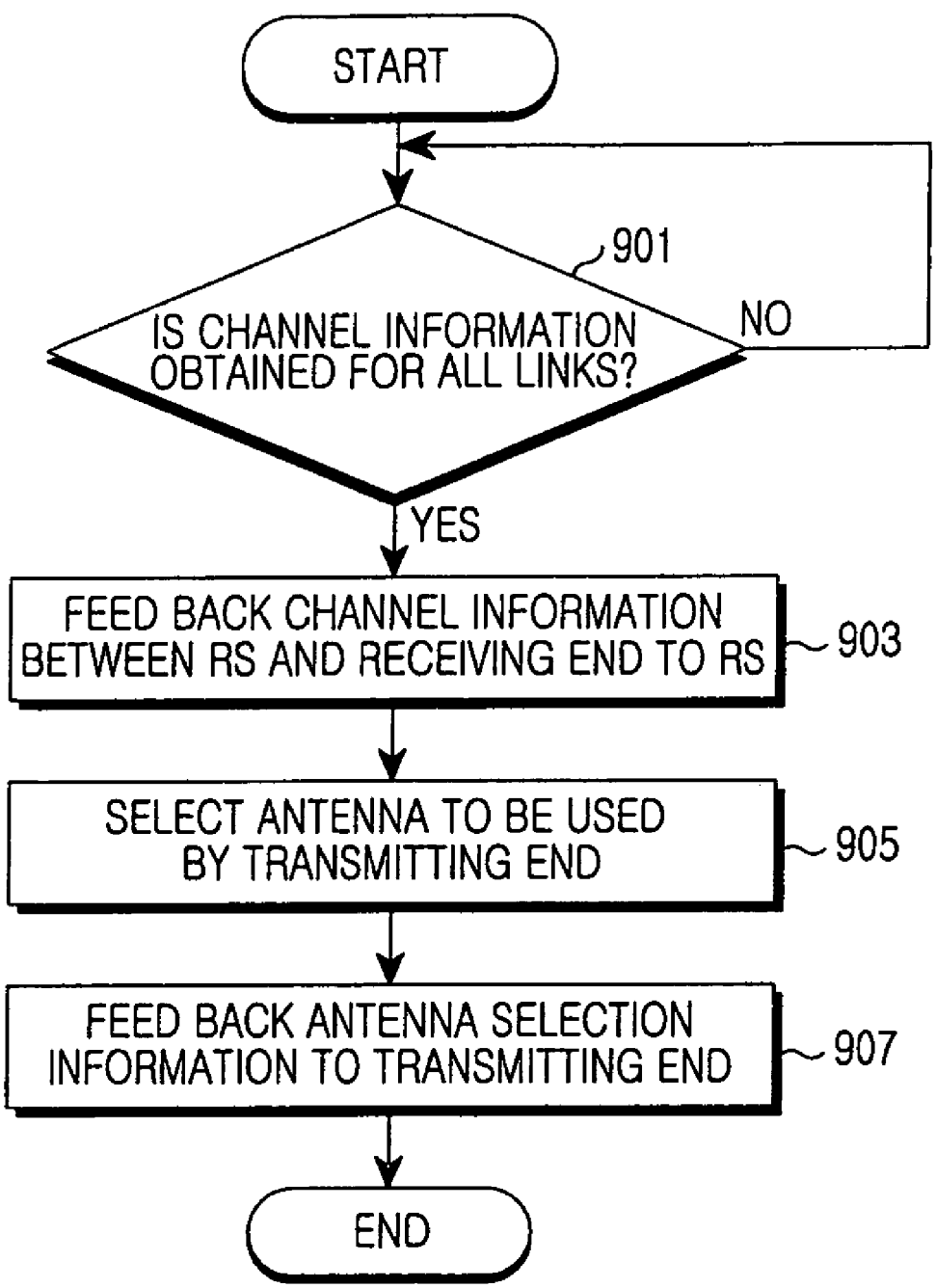
FIG. 9 is a flowchart illustrating a process in which a receiving end determines a signal transmission method for a transmitting end and an RS in a multi-antenna relay wireless communication system according to the second embodiment of the present invention.

FIG. 9 is a flowchart illustrating a process in which a receiving end determines a signal transmission method for a transmitting end and an RS in a multi-antenna relay wireless communication system according to the second embodiment of the present invention.

Referring to FIG. 9, the receiving end checks if channel information is obtained for all links in step 901. That is, the receiving end estimates all channels by using a pilot signal received from a transmitting end and an RS, and checks if channel information between the transmitting end and the RS is fed forward from the RS. The fed forward channel information is antenna selection information on a Tx antenna of the transmitting end, wherein the Tx antenna has priority for the RS.

If the channel information is received for all links, the receiving end feeds back to the RS the channel information, obtained by estimation, between the RS and the receiving end in step 903. The fed back channel information is antenna priority information on a Tx antenna of the RS, wherein the Tx antenna has priority for the receiving end.

In step 905, the receiving end selects the Tx antenna of the transmitting end. That is, when cooperative transmission is used, the Tx antenna of the transmitting end is selected so that the Tx antenna can maximize reception throughput.

In step 907, the receiving end feeds back the antenna selection information to the transmitting end.

Figure 10:
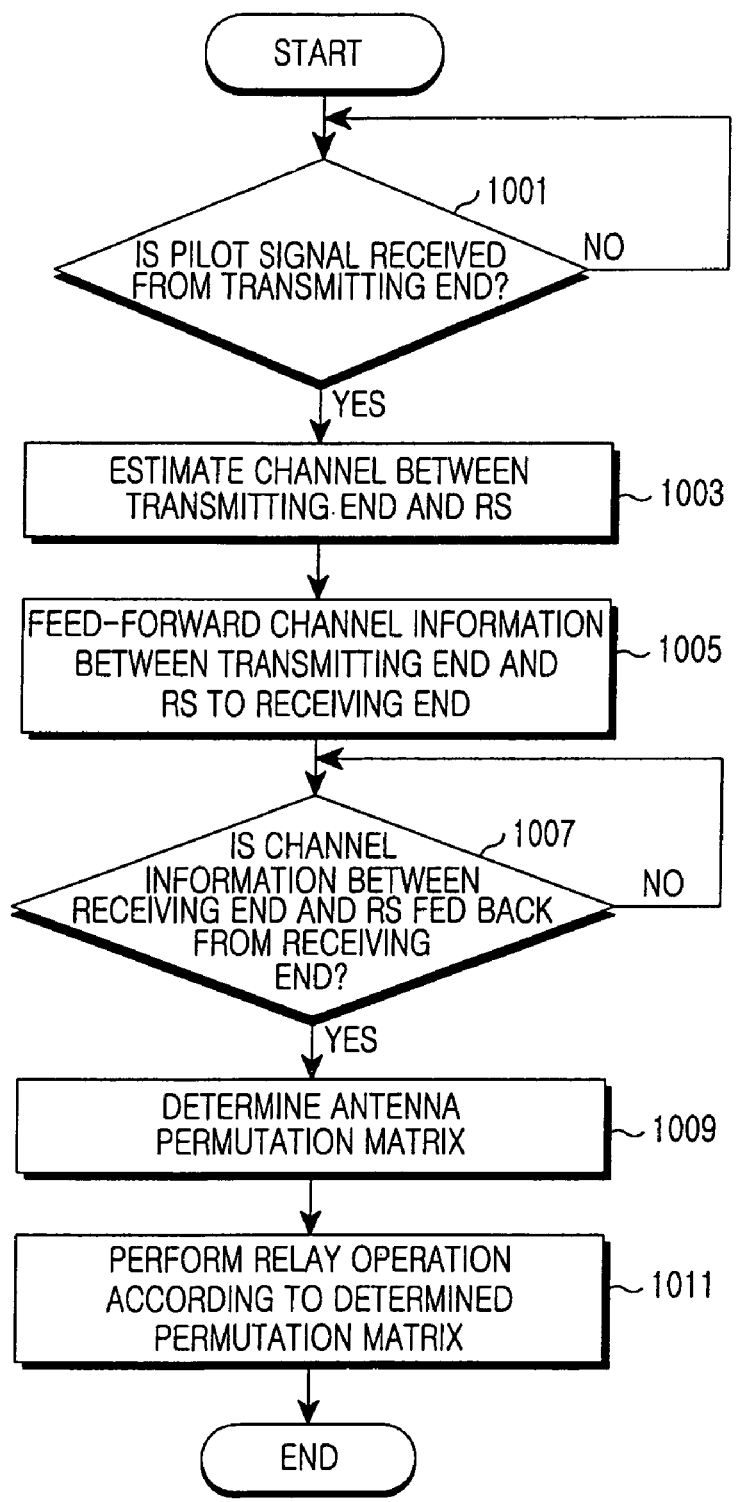
FIG. 10 is a flowchart illustrating a process in which an RS determines a relay signal processing method in a multi-antenna relay wireless communication system according to the second embodiment of the present invention.

FIG. 10 is a flowchart illustrating a process in which an RS determines a relay signal processing method in a multi-antenna relay wireless communication system according to the second embodiment of the present invention.

Referring to FIG. 10, the RS checks if a pilot signal is received from a transmitting end in step 1001.

In step 1003, the RS estimates a channel between the transmitting end and the RS using the pilot signal.

In step 1005, the RS feeds forward the estimated channel information to the receiving end. In addition, the RS transmits the pilot signal to the receiving end. The fed forward channel information is antenna selection information on a Tx antenna of the transmitting end, wherein the Tx antenna has priority for the RS.

In step 1007, the RS checks if channel information between the RS and the receiving end is fed back from the receiving end. The fed back channel information is antenna priority information on a Tx antenna of the RS, wherein the Tx antenna has priority for the receiving end.

If the channel information is fed back, the RS determines an antenna permutation matrix to relay a signal in step 1009. That is, for a signal received through each antenna, the RS determines an antenna through which the signal will be transmitted. In other words, the RS determines how Rx antennas and Tx antennas will be matched to perform a relay operation.

In step 1011, the RS relays a signal between the transmitting end and the receiving end according to the determined permutation matrix.

Figure 11:
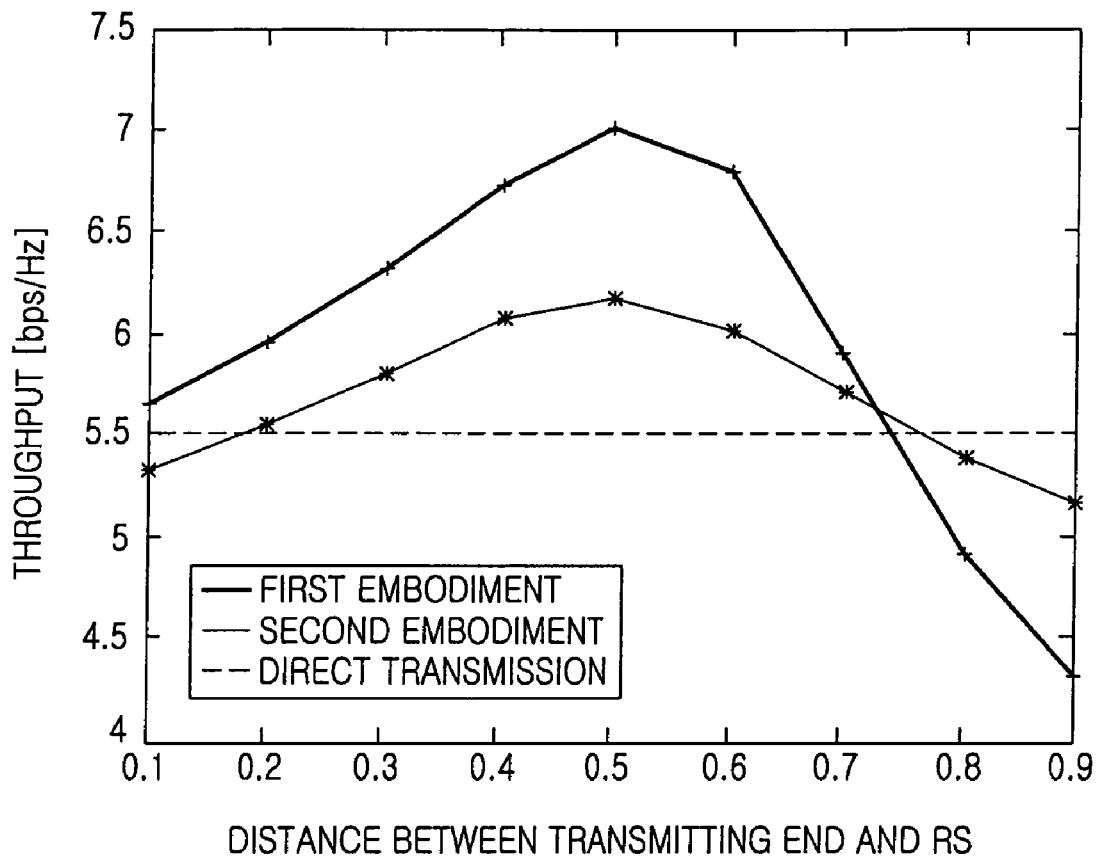
FIG. 11 is a graph illustrating throughput of cooperative transmission in a multi-antenna relay wireless communication system according to the present invention.

FIG. 11 is a graph illustrating throughput of cooperative transmission in a multi-antenna relay wireless communication system according to the present invention.

Throughput in bps/Hz is shown in the graph of FIG. 11 with respect to the first embodiment of the present invention, the second embodiment of the present invention, and a case where direct transmission is made instead of using cooperative transmission. It is assumed herein that a SNR is 5 dB, the number of streams used by an RS is 1, and the number of antennas of the RS is 3.

Referring to FIG. 11, when a distance between the transmitting end and the RS is short, that is, a channel between the receiving end and the transmitting end is similar to a channel between the receiving end and the RS, the first and second embodiments of the present invention show lower throughput in comparison with the direct transmission. However, as the distance between the transmitting end and the RS increases, the cooperative transmission according to the first and second embodiments of the present invention shows higher throughput in comparison with the direct transmission. On the contrary, when a distance between the RS and the receiving end is short, the method according to the first and second embodiments of the present invention has lower throughput in comparison with the direct transmission. Therefore, when the cooperative transmission of the present invention is performed by taking relative locations of the transmitting end, the receiving end, and the RS into account, the throughput can be improved in the system.

In comparison with the first and second embodiments of the present invention, as the distance between the RS and the transmitting end increases, two curves on the graph intersects at a point where a magnitude relation between throughputs of the two embodiments starts to change. That is, according to the distance between the transmitting end and the RS, a simple cooperative transmission method based on antenna selection shows superior throughput to a complex cooperation transmission method that requires accurate channel information.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A receiving end apparatus in a multi-antenna relay wireless communication system using cooperative transmission, the receiving end apparatus comprising:
    an estimator configured to estimate a channel between a transmitting end and a relay station;
    a reader configured to read channel gain information, which is feed-forwarded from the relay station, between the transmitting end and the relay station with respect to all antennas;
    a feedback unit configured to determine a covariance matrix used to regulate power of a Transmit (Tx) signal with respect to all antennas of the transmitting end and a relay matrix used to process relay station signals from the relay station by using channel information received from the estimator and the reader, and to feed back information on the determined covariance and relay matrices; and
    a detector configured to detect the Tx signal by combining a first signal received from the transmitting end at a first Tx time, a second signal received from the transmitting end at a second Tx time, and a relay station signal received from the relay station at the second Tx time.

2. The receiving end apparatus of claim 1, further comprising a determining unit configured to determine whether the covariance and relay matrices are optimally configured.

3. The receiving end apparatus of claim 2, wherein, if the determining unit determines that the covariance and relay matrices are not optimally configured, the feedback information re-determines either the covariance matrix or the relay matrix, and feeds back information on the re-determined matrix.

4. The receiving end apparatus of claim 3, wherein the determining unit computes an improvement value of a reception throughput as a result of the configuration of the covariance and relay matrices, and, if the improvement value of the reception throughput is less than or equal to a threshold, determines that the covariance and relay matrices are optimally configured.

5. The receiving end apparatus of claim 4, wherein the determining unit measures the reception throughput by using one of a Signal to Interference and Noise Ratio (SINR), a Signal to Noise Ratio (SNR), and a Carrier to Interference and Noise Ratio (CINR).

6. The receiving end apparatus of claim 4, wherein, if the number of times of performing re-determination on either the covariance matrix or the relay matrix is equal to the threshold, the determining unit determines that the covariance and relay matrices are optimally configured.

7. The receiving end apparatus of claim 4, wherein, if the covariance and relay matrices are optimally configured, the feedback unit reports to the transmitting end and the relay station that the covariance and relay matrices are optimally configured.

8. A receiving end apparatus in a multi-antenna relay wireless communication system using cooperative transmission, the receiving end apparatus comprising:
    an estimator configured to estimate a channel between a transmitting end and a relay station;
    a reader configured to read information on a Transmit (Tx) antenna of the transmitting end, wherein the information is feed-forwarded from the relay station and the Tx antenna has priority for the relay station;
    a feedback unit configured to select the at least one of Tx antenna of the transmitting end by using channel information provided from the estimator and the reader, for feeding back antenna selection information to the transmitting end, and to feed back channel information between the relay station and the receiving end to the relay station; and
    a detector configured to detect a Tx signal by combining a first signal received from the transmitting end at a first Tx time, a second signal received from the transmitting end at a second Tx time, and a relay station signal received from the relay station at the second Tx time.

9. The receiving end apparatus of claim 8, wherein the feedback unit feeds back information on at least one Tx antenna of the relay station to the relay station, wherein at least one Tx antenna has priority for the receiving end.

10. An operation method of a receiving end in a multi-antenna relay wireless communication system using cooperative transmission, the operation method comprising:
    estimating a channel between a transmitting end and a relay station;
    reading channel gain information, which is feed-forwarded from the relay station, between the transmitting end and the relay station with respect to all antennas;
    determining a covariance matrix used to regulate power of a Transmit (Tx) signal with respect to all antennas of the transmitting end and a relay matrix used to process relay station signals from the relay station by using channel information;
    feeding back information on the determined covariance and relay matrices; and
    detecting the Tx signal by combining a first signal received from the transmitting end at a first Tx time, a second signal received from the transmitting end at a second Tx time, and a relay station signal received from the relay station at the second Tx time.

11. The operation method of claim 10, further comprising:
    determining whether the covariance and relay matrices are optimally configured; and
    if the determination result shows that the covariance and relay matrices are not optimally configured, re-determining either the covariance matrix or the relay matrix, and feeding back information on the re-determined matrix.

12. The operation method of claim 11, wherein determining whether the covariance and relay matrices are optimally configured comprises:
    computing an improvement value of a reception throughput as a result of the configuration of the covariance and relay matrices; and
    if the improvement value of the reception throughput is less than or equal to a threshold, determining that the covariance and relay matrices are optimally configured.

13. The operation method of claim 12, wherein the reception throughput is measured by using one of a Signal to Interference and Noise Ratio (SINR), a Signal to Noise Ratio (SNR), and a Carrier to Interference and Noise Ratio (CINR).

14. The operation method of claim 11, wherein determining whether the covariance and relay matrices are optimally configured comprises, if a number of times of performing re-determination on either the covariance matrix or the relay matrix is equal to the threshold, determining that the covariance and relay matrices are optimally configured.

15. The operation method of claim 11, further comprising, if the covariance and relay matrices are optimally configured, reporting to the transmitting end and the relay station that the covariance and relay matrices are optimally configured.

16. An operation method of a receiving end in a multi-antenna relay wireless communication system using cooperative transmission, the operation method comprising:
- estimating a channel between a transmitting end and a relay station;
- reading information on a Transmit (Tx) antenna of the transmitting end, wherein the information is feed-forwarded from the relay station and the Tx antenna has priority for the relay station;
- selecting at least one Tx antenna of the transmitting end by using channel information provided as a result of estimating and reading;
- feeding back antenna selection information to the transmitting end, and feeding back channel information between the relay station and the receiving end to the relay station; and
- detecting a Tx signal by combining a first signal received from the transmitting end at a first Tx time, a second signal received from the transmitting end at a second Tx time, and a relay station signal received from the relay station at the second Tx time.

17. The operation method of claim 16, wherein channel information that is fed back to the relay station is information on at least one Tx antenna of the relay station, wherein at least one Tx antenna has priority for the receiving end.

18. A multi-antenna relay wireless communication system using cooperative transmission, the multi-antenna relay wireless communication system comprising:
- a receiving end configured to determine a covariance matrix used to regulate power of a Transmit (Tx) signal with respect to all antennas of the transmitting end and a relay matrix used to process relay station signals from a relay station by using channel information between a transmitting end and the relay station, between the transmitting end and the receiving end, and the relay station and the receiving end, and to feed back information on the determined covariance and relay matrices;
- the transmitting end configured to transmit a first signal at a first Tx time and a second signal at a second Tx time by regulating Tx power for each antenna according to the covariance matrix; and
- the relay station for configured to receive the first signal from the transmitting end at the first Tx time and transmit the received first signal at the second Tx time.

19. The multi-antenna relay wireless communication system of claim 18, wherein the receiving end detects the Tx signal by combining the first signal received from the transmitting end at a first Tx time, the second signal received from the transmitting end at a second Tx time, and the first signal received from the relay station at the second Tx time.

20. The multi-antenna relay wireless communication system of claim 18, wherein the receiving end determines whether the covariance and relay matrices are optimally configured, and, if a result of the determination shows that the covariance and relay matrices are not optimally configured, re-determines either the covariance matrix or the relay matrix, and feeds back information on the re-determined matrix.

21. The multi-antenna relay wireless communication system of claim 20, wherein the receiving end computes an improvement value of a reception throughput as a result of the configuration of the covariance and relay matrices, and, if the improvement value of reception throughput is less than or equal to a threshold, determines that the covariance and relay matrices are optimally configured.

22. The multi-antenna relay wireless communication system of claim 21, wherein the receiving end measures the reception throughput by using one of a Signal to Interference and Noise Ratio (SINR), a Signal to Noise Ratio (SNR), and a Carrier to Interference and Noise Ratio (CINR).

23. The multi-antenna relay wireless communication system of claim 20, wherein, if the number of times of performing re-determination on either the covariance matrix or the relay matrix is equal to the threshold, the receiving end determines that the covariance and relay matrices are optimally configured.

24. The multi-antenna relay wireless communication system of claim 20, wherein, if the covariance and relay matrices are optimally configured, the receiving end reports to the transmitting end and the relay station that the covariance and relay matrices are optimally configured.

* * * * *